April 2, 1940.  H. N. OTT  2,195,657
MEANS FOR CENTERING MICROSCOPE OBJECTIVES
Filed June 28, 1937
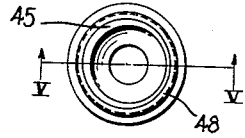
Fig. IV
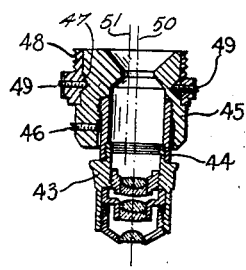
Fig. V
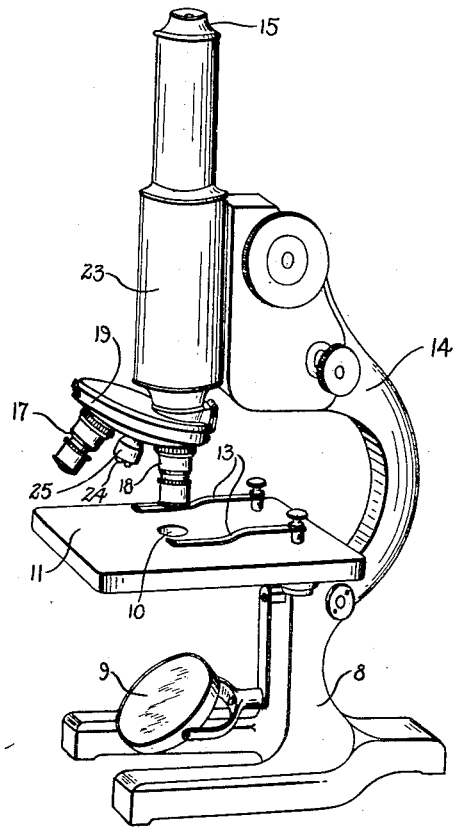
Fig. I
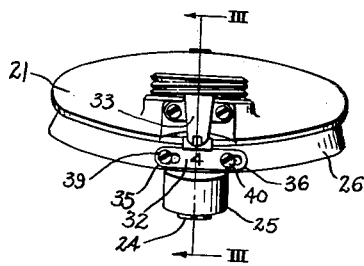
Fig. II
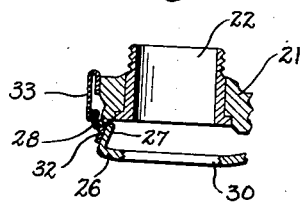
Fig. III
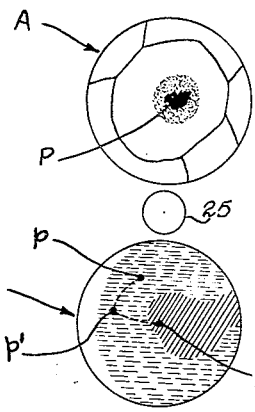
Fig. VI
INVENTOR
HARVEY N. OTT
BY
Harry H. Styll.
ATTORNEY Patented Apr. 2, 1940

2,195,657

UNITED STATES PATENT OFFICE 2,195,657

MEANS FOR CENTERING MICROSCOPE OBJECTIVES

Harvey N. Ott, Buffalo, N. Y., assignor to Spencer Lens Company, Buffalo, N. Y., a corporation of New York Application June 28, 1937, Serial No. 150,789

5 Claims. (Cl. 88—39)

This invention relates to the parfocalizing and centering of microscope objectives and more particularly to an adjustment for such objectives which makes it possible to bring the fields of a plurality of objectives on a microscope to a common centering.

Accordingly, one object of my invention is to improve the manner of parcentering objectives on the nosepiece of a microscope. Another object of my invention is to devise such a mount for an objective that its optical axis may be shifted to shift its field.

A further object of my invention is to make such provision for focusing an objective and for moving the optical axis of the objective mounted on the nose piece of a microscope that such focusing and such movement, in cooperation with adjustment of the nose piece about its own center, makes possible the parfocalizing and centering of objectives on the nosepiece.

In the accompanying drawing which illustrates my invention,

Fig. I is a view in perspective of a microscope with a nose piece carrying a pair of objectives;

Fig. II is a view in side elevation of the nose piece of the microscope;

Fig. III is a fragmentary view in section on the line III—III of Fig. II;

Fig. IV is a plan view of one of the objectives;

Fig. V is a view in vertical section on the line V—V of Fig. IV; and

Fig. VI is a diagrammatic view showing the fields of the microscope objectives and illustrating my improved manner of centering one of these fields.

Such a microscope as is illustrated in Fig. I ordinarily provides objectives of different power. These objectives are carried by a nose piece which is rotatable so as to bring either objective into alignment for use in viewing the slide or other object upon which the optical system is to be focused.

The microscope should be so adjusted that a point at the center of the field of one objective shall be in the center of the field of the other objective. This adjustment is accomplished according to my improved method by rotating the optical axis of the objective on an axis eccentric to, and parallel to, said optical axis of said objective, so that the optical axis takes a position on an arc the center of which is the center of revolution of the nose piece and the radius of which is equal in length to that of the arc on which the objective with which it is to be centered rotates with the nose piece. The optical axis of the objective is then moved along this arc until its optical axis coincides with the position of the optical axis of the objective with which it is to be centered when said objective is functioning.

This is done while the ovserver looks through the microscope. He will observe the centering of the optical axis of one objective to that of another as follows: Referring to Fig. VI there is shown a field A of one of the objectives and a field B of the other objective, the magnification in field B being four times that in field A. Fig. VI is a diagrammatic view and illustrates both fields as being rotatable about the hub 25; although it is obvious that actually but one field can be in existence at a time. This figure serves to illustrate the relative positioning of a common point in the two fields and my improved method for parcentering these objectives.

Here it is assumed that the objective of the higher power is adjustable for centering its field. This adjustment is accomplished according to my improved method, by observing a point at the center of the field A, and then bringing this same point to the center of field B. Take a point at the center of field A; as shown in field A this point is at P. Assume that this point is in the position $p$ when viewed through the adjustable objective, that is, in field B. By rotating the objective on an axis parallel to its optical axis, this optical axis is moved so that the point is apparently moved from position $p$ to $p'$ which indicates that the optical axis of the adjustable objective is on the arc $p'$—P described by the optical axis of the objective with which it is to be centered when the nose piece is revolved about the center of the nose piece. This arc $p'$—P described when the nose piece is revolved I term the common orbit of centers. Then by rotating the nose piece about the center of the latter, the axis of the adjustable objective is moved to a point where the point $p'$ seems to be moved to take up its desired position P at the center of the field. The principles underlying these considerations have been followed in the construction illustrated in the drawing. A further feature of my invention, therefore, is my improvement in the mount of the objective which makes provision for a shift in the field of the objective along an arcuate path.

The microscope illustrated in Fig. I includes a base 8 carrying a mirror 9 for throwing a beam of light upwardly through the opening 10 in the stage 11 of the microscope. Clamps 13 are provided for holding a slide or other object in position on the stage 11. An arm 14 supports the optical system of the microscope including the ocular 15.

The objectives 17 and 18 are carried by the nose piece 19 of the microscope, the latter providing for swinging one objective into alignment and the other one out of alignment when it is desired to interchange the objectives to obtain a different size of magnification.

The fixed part 21 of the nose piece (see Figs. II and III) is furnished with a threaded sleeve 22 for securing the part 21 to the body tube 23 of the microscope. This fixed part 21 provides a stud 24 on which the hub 25 of the movable part 26 of the nose piece 19 is rotatably mounted. The part 26 has an upturned flange 27 to close in the space between parts 21 and 26. Threaded openings, one of which is illustrated at 30 in Fig. III, are provided on the movable part 26 for receiving the objectives. In order to stop the rotation of the part 26 with a particular objective in accurately adjusted position, a click is provided for each objective.

The click illustrated in Figs. II and III includes a notched element 32 carried by the part 26 and a spring pawl member 33 carried by the part 21. The notched element 32 is slightly adjustable about the periphery of the part 26 while the position of the spring pawl member 33 on the part 21 is fixed. As shown in Fig. II the member 32 has a pair of ears 35 and 36, each of the ears being provided with an elongated opening through which pass the screws 39 and 40 which bind the member 32 in adjusted position. Due to the elongation of these openings, the member 32 may be adjusted in either direction by loosening the screws 39 and 40; and by tightening these screws the member 32 is held in adjusted position. Such adjustment of the member 32 about the periphery of the part 26 makes possible the shifting of a point in the field of the objective along an arc of the common orbit of centers of which a portion is indicated in Fig. VI by the broken line p' P.

In accordance with my invention I make provision for bringing a point such as the point p in the field B into position on this common orbit of centers. This I accomplish by the mount for the optics of the microscope objective, an illustrative embodiment of such a mount being illustrated in Figs. IV and V. The housing for the lenses of the objective is in two parts, the lower part being a tube or boot 43, and the upper part or mount including both a tube 44 and a sleeve 45. The lower tube 43 is threaded into the lower end of the upper tube 44. The upper tube 44 is in turn axially mounted in the sleeve 45 so as to be adjustable longitudinally of the axis of this sleeve for parfocalizing (as will later be explained). In the illustrative embodiment shown, the upper tube 44 is threaded into the interior of the sleeve 45, and it is secured in adjusted position by a set screw 46. The tubes 43 and 44 so support the optics of the objective in the sleeve 45 that the optical axis 50 is eccentric relative to the axis 51 of the bearing or collar 48 in which the sleeve 45 revolves.

The mount including the sleeve 45 is rotatably mounted in a connection by which the objective may be secured to the microscope, and herein more particularly secured in an opening in the nose piece of the microscope, such as the opening 30. The connection which serves to attach the objective to the microscope preferably takes the form of a collar 48 which is threaded for engagement with the threads in the opening 30. Set screws 49 extend through the collar 48 into engagement with the sleeve 45 and preferably engage in an annular groove 47 surrounding the sleeve 45 in registry with the set screws 49.

From the above description it will be apparent that the sleeve 45 can be rotated in the collar 48 and when so rotated its axis of rotation is the one indicated at 51. The optical axis 50, shown passing through the lenses of Fig. V, is parallel to but offset from the axis 51. This axis is, of course, carried around bodily with the sleeve 45 when it is rotated in its collar 48 so as to circle about the axis 51.

By loosening the set screws 49, the sleeve 45 carrying the microscope objective may be rotated on an axis which is eccentric relative to the optical axis of the objective but parallel thereto. Preferably this axis is offset but a slight amount, as the required shift in the field of the objective should not be large. Such rotation about an eccentric axis apparently brings about movement of a point such as the point illustrated at p in field B of Fig. VI on to the above mentioned common orbit of centers. Because of the adjustment in the click which has been above discussed, it is then possible to move the axis of the objective to a position where the point p' appears in the central position P on this orbit.

From the above it will be apparent that by loosening the set screw 46 the housing for the lenses of the objective may be raised and lowered along the axis of the sleeve 45 for focusing the objective. It should not be necessary to thus focus the objective each time it is swung into alinement in place of the other objective. By means of the threaded connection between the tubes 44 and 45, the proper focus for either or both objectives may be brought about at the common setting of the body tube 23 of the microscope for the two objectives. In other words the body tube 23 is customarily moved toward or away from the stage 11 to focus the microscope on the slide positioned on the stage; and when the tube 23 is in this position of focus, the objectives may be used interchangeably by swinging the nose piece so as to aline the selected objective with the tube 23, if use of the threaded connection between tubes 44 and 45 has been made as above explained. This is known as parfocalizing.

Certain of the advantages of my improved mount are more clearly apparent in connection with Fig. V. For instance, the threading of tube 44 into sleeve 45 and the mounting of sleeve 45 for rotation in connection 48 make possible both the parfocalizing and the centering of the objectives. Due to the set screws 46 and 49, either the parfocalizing or the centering can be brought about without affecting the other.

My invention has the important advantage that provision is made for centering the field of one objective on a nose piece on a microscope so as to register with the field of another objective on the same microscope so that a given point in one field will be found in a precisely corresponding position in the other field.

While I have illustrated and described one of the preferred embodiments of my invention it will be understood the invention may be otherwise embodied and practiced within the scope of the following claims.

I claim:

1. In a microscope, a main support having an ocular thereon, and a plurality of objectives pivotally mounted on said main support about a center offset from the axis of the ocular so as to be moved bodily in an arcuate path along the line of an arc substantially intersecting the center of the ocular into and out of substantial alignment with said ocular, means for rotatably supporting said objectives on said support with the optical axes thereof in eccentric but substantially parallel relation with their centers of rotation whereby the said optical axes may be moved in an eccentric path substantially parallel with said optical axes to position their respective focal points in the line of said arcuate path and to thereafter permit movement of said focal points into alignment with the ocular and a given point observed in the field of said objective.

2. In a microscope, a main support having an ocular thereon, and a plurality of objectives pivotally mounted on said main support about a center offset from the axis of the ocular so as to be moved bodily in an arcuate path along the line of an arc substantially intersecting the center of the ocular into and out of substantial alignment with said ocular, means for rotatably supporting said objectives on said support with the optical axes thereof in eccentric but substantially parallel relation with their centers of rotation whereby the said optical axes may be moved in an eccentric path substantially parallel with said optical axes to position their respective focal points in the line of said arcuate path and to thereafter permit movement of said focal points into alignment with the ocular and a given point observed in the field of said objective and means for supporting said objectives for longitudinal adjustment in the direction of their optical axes.

3. In a microscope, a main support having an ocular thereon, and a plurality of objectives pivotally mounted on said main support about a center offset from the axis of the ocular so as to be moved bodily in an arcuate path along the line of an arc substantially intersecting the center of the ocular into and out of substantial alignment with said ocular, means for rotatably supporting said objectives on said support with the optical axes thereof in eccentric but substantially parallel relation with their centers of rotation whereby the said optical axes may be moved in an eccentric path substantially parallel with said optical axes to position their respective focal points in the line of said arcuate path and to thereafter permit movement of said focal points into alignment with the ocular and a given point observed in the field of said objective and means for retaining said objectives in desired adjusted relation with respect to the ocular.

4. In a microscope, a main support having an ocular thereon, a member offset to one side of the longitudinal axis of said ocular, a plate-like member having a plurality of openings therein pivoted to said offset member about a center displaced relative to the longitudinal axis of the ocular an amount sufficient to cause the openings to move into substantial alignment with the ocular when the said plate-like member is rotated, each of said openings having a threaded bore, a collar threadedly connected to the threaded bore of each of said openings, a sleeve having an eccentric opening therein rotatably mounted in said collar, an objective connected with said sleeve with the optical axis thereof in substantial alignment with the opening in said sleeve and offset relative to the axis of said collar, said objectives being moved with said plate-like member bodily in an arcuate path along the line of an arc substantially intersecting the center of the ocular into and out of substantial alignment with said ocular, each of said objectives being adapted to be rotated in said collars to position their respective focal points substantially in the line of said arcuate path and being adapted to be moved in said arcuate path to a given aligned relation with said ocular.

5. In a microscope, a main support having an ocular thereon, a member offset to one side of the longitudinal axis of said ocular, a plate-like member having a plurality of openings therein pivoted to said offset member about a center displaced relative to the longitudinal axis of the ocular an amount sufficient to cause the openings to move into substantial alignment with the ocular when the said plate-like member is rotated, each of said openings having a threaded bore, a collar threadedly connected to the threaded bore of each of said openings, a sleeve having an eccentric opening therein rotatably mounted in said collar, an objective connected with said sleeve with the optical axis thereof in substantial alignment with the opening in said sleeve and offset relative to the axis of said collar, said objectives being moved with said plate-like member bodily in an arcuate path along the line of an arc substantially intersecting the center of the ocular into and out of substantial alignment with said ocular, each of said objectives being adapted to be rotated in said collars to position their respective focal points substantially in the line of said arcuate path and being adapted to be moved in said arcuate path to a given aligned relation with said ocular and means for retaining said objectives in adjusted position both with respect to the collars and to the ocular.

HARVEY N. OTT.